US010917325B2

(12) United States Patent
Pueblas

(10) Patent No.: US 10,917,325 B2
(45) Date of Patent: Feb. 9, 2021

(54) DERIVING TEST PROFILES BASED ON SECURITY AND NETWORK TELEMETRY INFORMATION EXTRACTED FROM THE TARGET NETWORK ENVIRONMENT

(71) Applicant: Fortinet, Inc., Sunnyvale, CA (US)

(72) Inventor: Martin C. Pueblas, Cutler Bay, FL (US)

(73) Assignee: Fortinet, Inc., Sunnyvale, CA (US)

(*) Notice: Subject to any disclaimer, the term of this patent is extended or adjusted under 35 U.S.C. 154(b) by 40 days.

(21) Appl. No.: 15/898,560

(22) Filed: Feb. 17, 2018

(65) Prior Publication Data
US 2019/0260663 A1   Aug. 22, 2019

(51) Int. Cl.
H04L 12/26 (2006.01)
H04L 29/06 (2006.01)
H04L 12/24 (2006.01)

(52) U.S. Cl.
CPC ......... H04L 43/50 (2013.01); H04L 41/0213 (2013.01); H04L 41/145 (2013.01); H04L 43/08 (2013.01); H04L 63/1416 (2013.01); H04L 63/1458 (2013.01)

(58) Field of Classification Search
None
See application file for complete search history.

(56) References Cited

U.S. PATENT DOCUMENTS

| 9,113,358 | B1* | 8/2015 | Lachwani | H04W 24/06 |
| 2003/0009696 | A1* | 1/2003 | Bunker | H04L 43/00 726/26 |
| 2011/0282642 | A1* | 11/2011 | Kruger | G06F 11/3664 703/27 |
| 2016/0080221 | A1* | 3/2016 | Ramachandran | G06F 16/285 709/224 |
| 2016/0232085 | A1* | 8/2016 | Vorganti | G06F 11/3692 |
| 2016/0294851 | A1* | 10/2016 | Langton | H04L 63/1416 |
| 2016/0330222 | A1* | 11/2016 | Brandt | H04L 63/1408 |
| 2016/0357660 | A1* | 12/2016 | Dean | G06F 11/3692 |
| 2017/0024308 | A1* | 1/2017 | Knoulich | G06F 8/60 |
| 2017/0093910 | A1* | 3/2017 | Gukal | H04L 63/1416 |
| 2017/0168885 | A1* | 6/2017 | Jain | H04L 43/50 |
| 2017/0230410 | A1* | 8/2017 | Hassanzadeh | H04L 63/1441 |
| 2017/0302554 | A1* | 10/2017 | Chandrasekaran | H04L 43/0882 |
| 2018/0011955 | A1* | 1/2018 | Gintis | H04L 43/14 |

\* cited by examiner

Primary Examiner — Donald L Mills

(57) ABSTRACT

Systems and methods for deriving test profiles for validating network devices based on security and network telemetry information extracted from the target network environment is provided. According to one embodiment, security and network telemetry information are extracted by a test generator during a monitoring period from one or more network devices running within a target network environment. Performance related parameters and data associated with the performance related parameters are then determined for the target network environment. A test profile is generated for validating a network device under test proposed to be installed within the target network environment based on any or a combination of the performance related parameters, the data associated with the performance related parameters, the security and network telemetry information and a set of capabilities of the network device under test.

20 Claims, 8 Drawing Sheets

US 10,917,325 B2

DERIVING TEST PROFILES BASED ON SECURITY AND NETWORK TELEMETRY INFORMATION EXTRACTED FROM THE TARGET NETWORK ENVIRONMENT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2018, Fortinet, Inc.

BACKGROUND

Field

Embodiments of the present invention generally relate to validation of network devices and/or network security devices for a target environment. More particularly, embodiments of the present invention relate to systems and methods for deriving test profiles to validate a network device and/or a network security device for a target network environment based on security and network telemetry information gathered regarding the target network environment.

Description of the Related Art

It is necessary to check the capabilities and functionalities of a new networking device or a new network security device before deploying it within a target network environment to ensure that the network device or the network security device can handle the traffic patterns expected to be encountered in the target network environment. Customers often request network security device or network device vendors to validate the vendors' solutions with traffic patterns observed within the customers' network environment. It is not always feasible to conduct onsite testing or an onsite proof of concept. For example, the new networking device might cause problems or otherwise interfere with the operations of the target network environment. One possible solution is to perform a packet capture within the target network environment and then run a replay of the captured traffic at the vendor's lab with a traffic generator; however, replaying traffic captures does not work well for stateful network devices. Meanwhile, the typical generic test profiles that may be run by a vendor prior to deployment may not adequately represent the specific target network environment in which the networking device is going to be installed.

Therefore, there exists a need for a mechanism to generate test profiles that more closely match the traffic patterns expected to be encountered in the target network environment.

SUMMARY

Systems and methods are described for deriving test profiles for validating network devices based on security and network telemetry information extracted from the target network environment. According to one embodiment, security and network telemetry information are extracted by a test generator during a monitoring period from one or more network devices running within a target network environment. Performance related parameters and data associated with the performance related parameters are then determined for the target network environment. A test profile is generated for validating a network device under test proposed to be installed within the target network environment based on any or a combination of the performance related parameters, the data associated with the performance related parameters, the security and network telemetry information and a set of capabilities of the network device under test.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
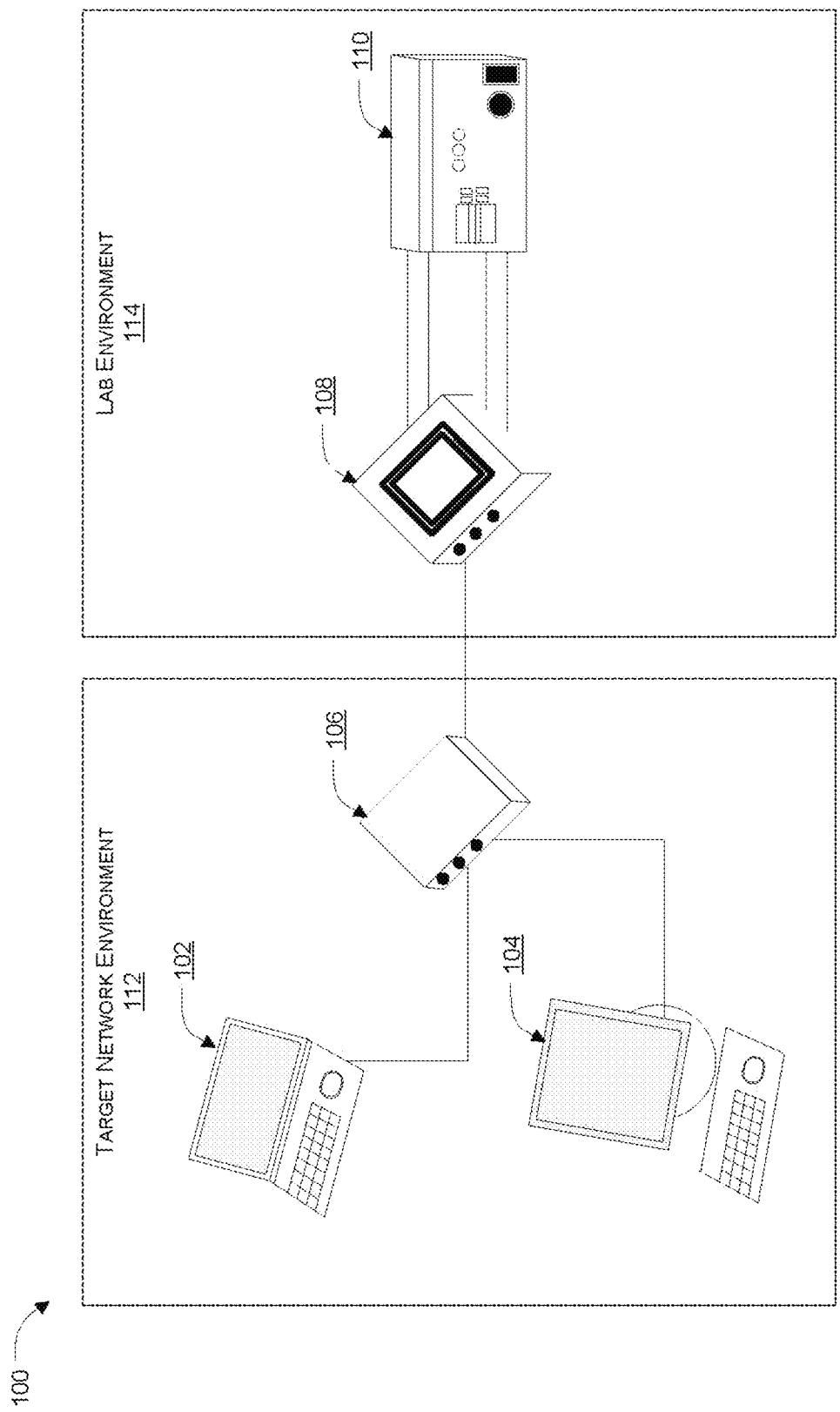
FIG. 1A is a simplified diagram illustrating a lab testing environment in accordance with an embodiment of the present invention.

Systems and methods are described for deriving test profile for validating network devices based on security and network telemetry information extracted from the target network environment. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, e.g. ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, e.g. software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrase "security and network telemetry information" generally refers to information that can be collected from a target network environment as a result of security visibility and network visibility. Information that can be collected as a result of network visibility includes, but is not limited to, information such as protocols, packet sizes, concurrent connections/flows, connections/flows per second, throughput. Information that can be collected as a result of security visibility includes, but is not limited to, information about security incidents, such as that detected by an intrusion prevention system (IPS) and antivirus (AV) activity, and application information derived from application control. Security visibility information may be useful to identify the type of security incidents observed within a customer site and their relative frequencies and provides information about the actual use of applications and their associated bandwidth consumption. As described further below, in embodiments of the present invention, security and network telemetry information are gathered/recorded for a specific period of time and based thereon performance related parameters, such as concurrent connections/flows, throughput and the like, can be derived by either calculating the averages or by obtaining the maximum observed values during the evaluation period.

The phrase "security device" generally refers to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of virtual appliances, dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named Different embodiments are described for deriving test profiles for validating network devices based on security and network telemetry information extracted from the target network environment. Described herein are embodiments that relates to a test generator that can be configured to extract security and network telemetry information from one or more network devices running within a target network environment, determine performance related parameters and data associated with the performance related parameters for the target network environment, and derive a test profile for validating a network device under test proposed to be installed within the target network environment. In an embodiment, the test profile can be derived based on any or a combination of the performance related parameters, the data associated with the performance related parameters, the security and network telemetry information and a set of capabilities of the network device under test. In an embodiment, the test generator can use security and telemetry information extracted, during a monitoring period, from one or more network device running within the target network environment.

As the one or more network devices installed in the target network environment have visibility into different events and statistics, the security and telemetry information extracted from the one or more network devices can be used to derive a test profile for validating a network device that is going to be part of the target network environment.

In some embodiments, the test generator may simulate network traffic of the target network environment to simulate the network device being tested is installed within the target network environment. In an embodiment, while running the simulation, the network device under test is treated as if it were part of target network environment. In an embodiment, the test generator can record result of said simulation and display a report of simulation to an administrator of the test generator. Simulation of network traffic of target network environment in lab environment to replicate conditions the network device would experience as part of the target network environment allows the network device to be validated for traffic patterns associated with the target network environment without actually being installed in the target network environment.

In some embodiments, the test generator can be configured to use machine learning to derive a test profile for validating the network device under test. In an embodiment, the test generator using machine learning can match determined performance related parameters with performance related parameters of pre-configured test profiles. The test generator can determine the test profile that more closely matches traffic patterns expected to be encountered in the target network environment. In some embodiments, the test generator may derive a closely matching test profile from pre-configured test profiles by matching the determined performance related parameters with performance related parameters associated with each of the pre-configured traffic profiles.

In an embodiment, the test generator can allow the administrator to edit the derived test profile used for simulating the network device within the target network environment. In some embodiments, the derived test profile can be completely machine generated. The machine generated test profile can be directly used for simulating traffic patterns associated with the target network and/or testing the network device under test. In some other embodiments, the derived test profile can be a human-assisted machine generated test profile, wherein a machine generated test profile may be further edited by an administrator.

In some embodiments, the pre-configured test profiles or the derived test profiles include but are not limited to test profiles related to Hypertext Transfer Protocol (HTTP)/HTTP Secure (HTTPS) connections per second (CPS), HTTP/HTTPS requests per second (RPS), HTTP/HTTPS concurrent connections (CC), Internet Protocol security (IPsec) performance test, IPsec tunnel CC, Transmission Control Protocol (TCP) throughput, TCP CC test, Turbo TCP test, TCP throughput, User Datagram Protocol (UDP) throughput, Request For Comments (RFC) 2544 throughput/latency/data loss, mail, attack replay, traffic replay, Distributed Denial of Service (DDoS), Domain Name Server (DNS) latency, Real Time Streaming Protocol (RTSP), packet capture, RTSP/Real-time Transport Protocol (RTP), and mixed traffic.

In some embodiments, a recording or logging device or the test profile generator may be temporarily installed within the target deployment environment and network telemetry information can be extracted from the one or more network devices during the monitoring period using any or a combination of Simple Network Management Protocol (SNMP), NetFlow, SysLog and a proprietary protocol of the test generator. The telemetry mechanism to be used for retrieving the security and network telemetry information may be configured by the administrator of the test profile generator. In an embodiment, network parameters and security parameters, data related to which form part of the security and network telemetry information, can be pre-configured by the administrator.

In some embodiments, the security and network telemetry information comprise network parameters, security parameters, data associated with the network parameters and/or data associated with the security parameters. The network parameters may include, but are not limited to, information regarding protocols used, number of connected devices, applications used, bandwidth usage, packet sizes observed and traffic patterns observed within the target network environment during the monitoring period. The security parameters may include, but are not limited to, data associated with Intrusion Detection Systems (IDSs), security incidences, antivirus activities, application control information, rules associated with IDS, rules associated with Intrusion Prevention Systems (IPSs), and rules associated with Denial of Service (DOS) attacks.

In some embodiments, the performance related parameters and data associated with the performance related parameters may be determined by the test generator. In some embodiments, the performance related parameters may be selected by the administrator and data associated with performance related parameters may be determined by analyzing the security and network telemetry information. In some embodiments, the performance related parameters and data associated with the performance related parameters can be determined by analyzing the security and network telemetry information retrieved from one or more network devices of the target network environment.

The performance related parameters include, but are not limited to, concurrent connections/flows, connections per second, flows per second, and throughput. In some embodiments, the performance related parameters and data associated with the performance related parameters comprise any or a combination of a number of connections per second between different network devices present in the target network environment, an average number of concurrent connections between the different network devices present in the target network environment, a maximum number of concurrent connections between the different network devices present in the target network environment, an average number of connected devices present in the deployment environment, a maximum number of connected devices present in the target network environment, network traffic throughput in the target network environment, and traffic latency between the different devices present in the target network environment.

In some embodiments, the set of capabilities include a set of capabilities of the network device under test to be tested and are selected by a network administrator or are derived from listed capabilities of the network device under test.

In some embodiments, the network device under test includes, but is not limited to, a unified threat management (UTM) appliance, an Intrusion Prevention System (IPS), an Intrusion Detection System (IDS), a gateway device, a network controller device, a firewall, a router, a DDoS prevention device, a software defined networking security device or other network security device or appliance.

FIG. 1A is a simplified diagram 100 illustrating a lab testing environment 114 in accordance with an embodiment of the present invention. As shown in FIG. 1A, a test generator 108 may be connected to an existing network device (for example, a switch 106) running within target network environment 112 to extract security and network telemetry information from the target network environment 112, determine performance related parameters and data associated with the performance related parameters for target network environment 112, and derive a test profile (not shown) for validating network device 110 in lab environment 114. As those skilled in the art will appreciate, network device 110 is the network device being validated for deployment within target network environment 112. Test generator 108 can generate a test profile to be run against network device 110 and can simulate the working of network device 110 in target network environment 112.

In an embodiment, an existing network device 106 can collect network telemetry information based on observed traffic within target network environment 112 during a monitoring period. In an embodiment, a specific network telemetry information collection device or software agent can be configured within target network environment 112 to collect security and network telemetry information. In an embodiment, test generator 108 can be part of a network device testing appliance. Test generator 106 is interchangeably used herein to collectively represent functionality of the test generator mentioned here as well other known functionality of a network device testing appliance.

Test generator 108 may have multiple network ports, wherein one or more network ports of the multiple network ports can be configured for performing management functionality (management ports) and other ports of the multiple network ports can be configured for performing testing (test ports) or for validating the network device under test. Some ports of test generator 108 can be configured for sending traffic in accordance with the test profile to be processed by network device 110. In some embodiments, the management port (usually mgmt or port1) can be configured to allow a user or an administrator of target network 112, to connect to test generator 108 via a web interface or through a command line interface through the Internet. The management ports can be configured to collect network security and network telemetry information and receive instruction from the administrator. In some embodiments, some of the test ports can be configured as client ports and other ports of the test ports can be configured as server ports that can connect to the network device under test. In an embodiment, client ports can be used to simulate traffic to/from multiple client devices, such as a laptop 102, a desktop 104 and other client devices (not shown) of target network environment 112 (which may be referred to herein as monitored devices). In an embodiment, interfaces, routes and firewall policies associated with network device 110 to be tested can be configured at test generator 108. In an embodiment, a set of capabilities of network device 110 to be tested for can be selected or defined by the user or the administrator. In some embodiments test parameters including, but not limiting to, test type, test template, IP versions, role of network device 110, client ports and server ports, test case specification can be generated by test generator 108 or part of these details may be configured by the user. In some embodiment, the test case specification for network device 110 can be determined by test generator 108.

Test generator 108 can discover the IP version(s) for which network device 110 needs to be tested, the role(s) (for example, network gateway or application server etc.) for which network device 110 needs to be tested, the working mode(s) (for example, Network Address Translation (NAT) mode, transparent mode, Web Proxy mode etc.) for which network device 110 needs to be tested and other details can be configured by the administrator or can be determined based on the security and network telemetry information extracted by test generator 108.

In an embodiment, a test profile can be generated by test generator 108 for validating performance of network device 110. In an embodiment, the test profile may include any or combination of the following tests: an HTTP/HTTPS CPS test, an HTTP/HTTPS RPS test, an HTTP/HTTPS CC test, an IPsec performance test, an IPsec tunnel CC test, a TCP throughput test, a TCP CC test, a Turbo TCP test, a TCP throughput test, a UDP throughput test, an RFC 2544 throughput/latency/data loss test, a mail test, an attack replay test, a traffic replay test, a DDoS test, a DNS latency test, an RTSP test, a packet capture test, an RTSP/RTP test, and a mixed traffic test.

Figure 1B:
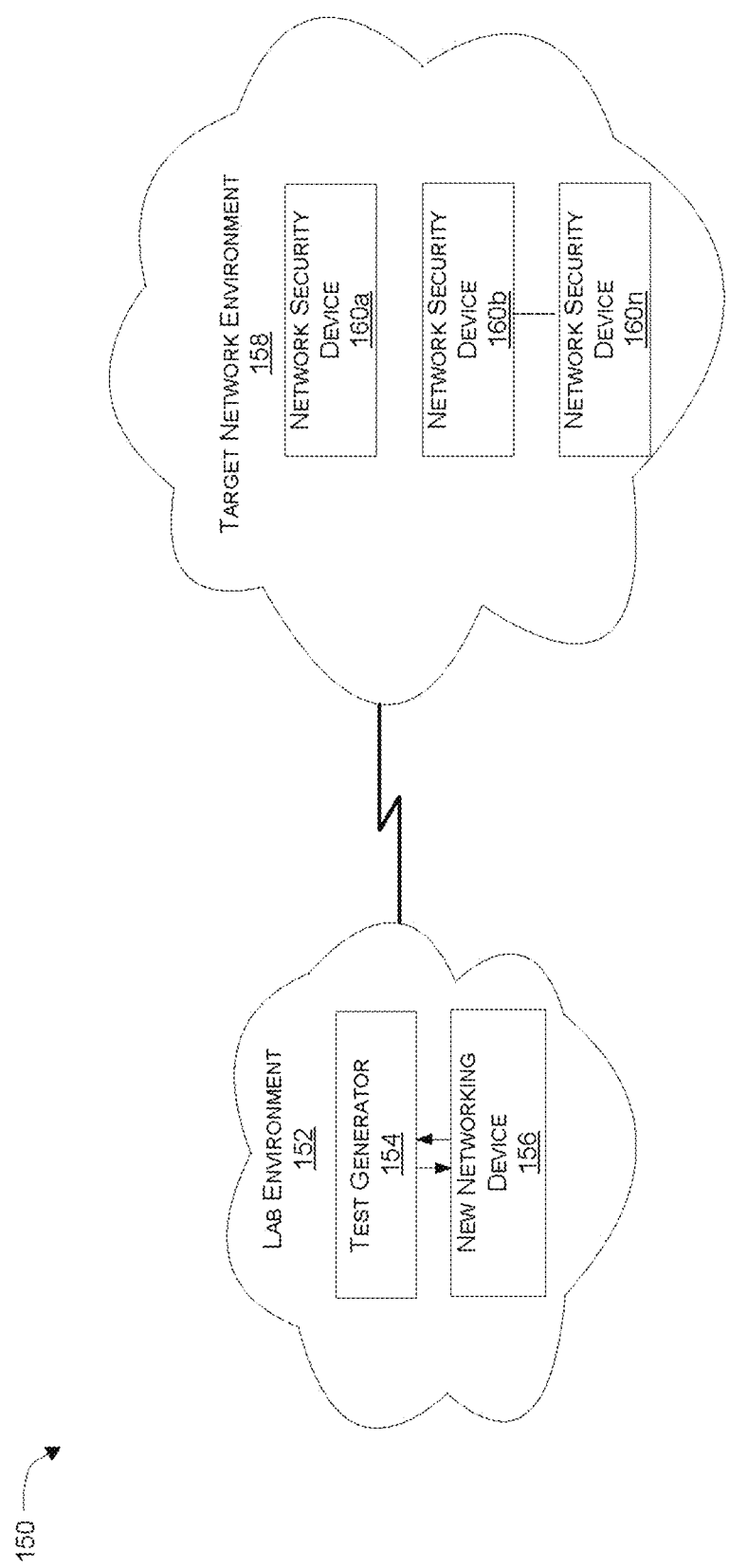
FIG. 1B is a simplified block diagram illustrating a lab environment receiving security and network telemetry information from a target/deployment network environment in accordance with an embodiment of the present invention.

FIG. 1B is a simplified block diagram 150 illustrating a lab environment 152 receiving security and network telemetry information from a target/deployment network environment 158 in accordance with an embodiment of the present invention. A test generator 154 configured to validate a new network device 156 for a target network environment 158 may generate a test profile to be loaded and executed by the traffic generator to test network device 156 with simulated traffic patterns and conditions of target network environment 158 in lab environment based on security and network telemetry information received from one or more network devices, such as network security device 160a, network security device 160b and network security device 160n of target network environment 158. Based on security and network telemetry information gathered by temporarily installing a recording or logging device or test profile generator within target network environment, for example, and querying the local devices via SNMP, for example, a test profile can be configured to meet average and/or peak traffic patterns observed within target network environment 158.

In an embodiment, the security and network telemetry information can be retrieved from one or more network security devices, and one or more network devices running within the target network environment 158. In an embodiment, the one or more network security devices and one or more network device, which may be collectively referred to as network devices 160a-n, may be any or combination of IDSs, antivirus detection devices, application control devices, DoS detection/mitigation devices, UTM appliances, IPSs, gateway devices, network controller devices, firewalls, routers, software defined network devices and software defined networking security devices.

The network devices 160a-n installed in target network environment 148 normally maintain network logs to gather information regarding traffic entering/existing or exchanged within target network environment 148. As those skilled in the art understand, there are different syslog logging levels (e.g., severity0-severity7), which are defined as Emergency, Alert, Critical, Error, Warning, Notice, Informational and Debug. The level of the syslog message specifies the type of messages that are sent to the syslog host.

Additionally, IDSs and/or other network-monitoring tools can be used to perform bandwidth monitoring, packet sniffing and intrusion detection. An example of a bandwidth monitoring tool is the Multi Router Traffic Grapher (MRTG), which is capable of monitoring the traffic load on network links and uses SNMP to read traffic counters of routers within target network environment 148. An example of a packet sniffing tool is Ethereal, which is a free network protocol analyzer for the UNIX and Windows operating systems that allows data to be examined from a live network or from a captured file on disk.

Specific network parameters and security parameters to be monitored may be configured by the user. The network logs collected by network devices 160a-n, referred collectively herein as security and network telemetry information, can be collected during a monitoring period.

In some embodiments, one or more network traffic logging devices can be installed within the target network environment 158 to collect the security and network telemetry data associated with target network environment 158. The one or more network traffic logging devices may include one or more independent network devices and/or software agents running on computer systems within target network environment 158 or network devices 160a-n. The one or more network traffic logging devices can be configured to collect security and network telemetry information from network devices 160a-n and provide the security and network telemetry information to test generator 154.

In an embodiment, test generator 154 or test generator 108 may derive a test profile based on any or a combination of the performance related parameters, the data associated with the performance related parameters, the security and network telemetry information and a set of capabilities of the network device under test.

In some embodiments, test generator (for example, test generator 108 of FIG. 1A or test generator 154 of FIG. 1B) may determine performance related parameters and data associated with performance related parameters by analyzing the security and network telemetry information. In some embodiments, the performance related parameters can be determined from the security and network telemetry information based on discovered capabilities of network device to be tested. In some embodiment, part of the performance related parameters can be defined by the user.

The test generator may use a machine learning approach to derive a test profile for validating the network device. For different combinations of sets of performance related parameters, pre-configured test profiles may have been pre-mapped. In an embodiment, performance related parameters determined by the test generator can be matched with the performance related parameters of the pre-configured test profiles using the machine learning approach to identify a closely matching test profile. A test profile from the list of pre-configured test profiles for which set of performance related parameters matches more closely can be derived as a test profile for validating the network device for target network environment.

Figure 2A:
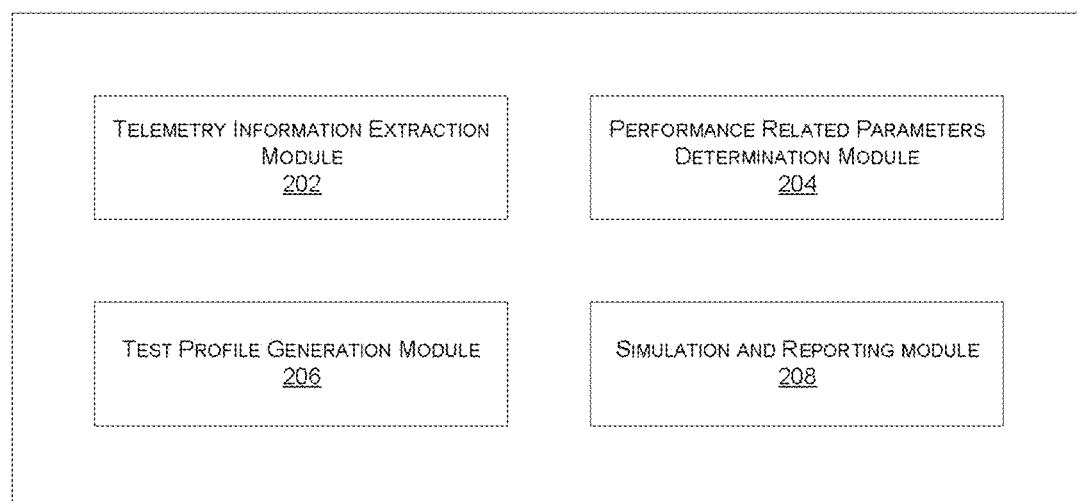
FIG. 2A illustrates exemplary functional modules of a system for deriving test profiles for a network device in accordance with an embodiment of the present invention.

FIG. 2A is a block diagram illustrating exemplary functional modules of a test profile generator 200 in accordance with an embodiment of the present invention. Test profile generator 200 may include a security and network telemetry information extraction module 202 configured to extract security and network telemetry information from one or more network devices running within a target network environment, a performance related parameters determination module 204 configured to determine performance related parameters and data associated with performance related parameters for the target network environment, and a test profile generation module 206 configured to derive a test profile for validating a network device under test proposed to be installed within the target network environment based on any or a combination of the performance related parameters, the data associated with the performance related parameters, the security and network telemetry information and a set of capabilities of the network device under test.

Test profile generator 200 may further include a simulation and reporting module 208 configured to simulate network traffic of the target network environment based on the test profile and record results of said simulation. In an embodiment, simulation and reporting module 208 may simulate network traffic in a lab environment that is consistent with that observed within target network environment so as to emulate traffic patterns the network device under test would be expected to handle in the target network environment.

In an embodiment, test profile generator 200 may derive a test profile and cause the network device to be tested or validated for a particular network environment by loading and executing the test profile by test profile generator 200 so as to generate emulated traffic in accordance with the derived test profile.

In an embodiment, the one or more network devices can represent existing network devices associated with the target network environment or can represent monitoring devices temporarily placed within the target network environment to collect the desired telemetry information and performance related parameters. The monitoring devices can be configured to have visibility into network traffic with the ability to generate and provide security and network telemetry information using one of the supported telemetry methods. For example, the monitoring devices could be inline with traffic, could connect passively via a network tap (transparent IDS), could query log data collected by other network devices via SNMP, obtain the security and network telemetry information with traffic mirroring or any similar means. Firewall, routers and switches etc. are examples of devices that can act as monitored devices.

In an embodiment, security and network telemetry information extraction module 202, configured within test profile generator 200, may extract security and network telemetry information during a monitoring period or can receive the security and network telemetry information in the form of network logs from one or more network devices running within the target network environment. The security and network telemetry information extraction module 202 may be configured to extract network logs, on demand, from one or more network devices installed within the target network environment.

Security and network telemetry information extraction module 202 can be a collector agent, which can be software or hardware component responsible for collecting and storing network and security telemetry information retrieved from the one or more network devices running within the target network environment. Depending on the telemetry method used, the security and network telemetry information could be gathered with push or pull mechanisms. For example, to retrieve security and network telemetry information, the administrator of test profile generator 200 can configure SNMP queries, which pull values from the one or more network device running in the target network environment. Similarly, to retrieve security and network telemetry information, the administrator can configure SNMP mechanism, which traps and Syslog push the security and network telemetry information from the one or more devices to module 202.

In an embodiment, network telemetry information extraction module 202 can provide a user interface and allow a user to configuration of the telemetry methods to be used to retrieve the security and network telemetry information. In an embodiment, the security and network telemetry information as retrieved by the module 202 can be stored in a database or repository.

In some embodiments, the security and network telemetry information may include network logs received from one or more networking devices, including but not limiting to firewall, router, gateway, switches, network controller etc. and security logs received from one or more network security devices including but not limiting to DoS detection systems, DoS mitigation/prevention systems, intrusion prevention/detection systems and the like.

In some embodiments, the security and network telemetry information may include network parameters, including any or a combination of information regarding protocols used within the target network environment, the number of connected devices within the target network environment, the applications used within the target network environment, bandwidth usage within the target network environment, packet sizes observed and traffic patterns observed within the target network environment during the monitoring period. In some embodiments, the security and network telemetry information comprises security parameters, including any or a combination of data associated with Intrusion Detection System (IDS), security incidences, antivirus activities, application control information, rules associated with IDS, rules associated with Intrusion Prevention System (IPS), and rules associated with Denial of Service (DOS) attacks. The one or more network devices may collect the network parameters and security parameters, as these devices installed into the target network environment generally have network and security visibility.

In an embodiment, module 202 may extract the security and network telemetry information, from network devices associated with the target network environment, using different protocols including, but not limiting to, SNMP, NetFlow, SysLog and a proprietary protocol of test protocol generator 200. The security and network telemetry information can be collected for a period of time, referred to herein as the monitoring period.

In an embodiment, performance related parameter determination module 204 can determine performance related parameters and data associated with the performance related parameters. In an embodiment, performance related parameter determination module 204 configured at the test generator may determine performance related parameters and data associated with performance related parameters for the target network environment based on the retrieved security and network telemetry information.

In an embodiment, module 204 can calculate performance related parameters, such as concurrent connections/flows, throughput etc. by either calculating averages or by identifying the maximum observed values of those performance related parameters during the monitoring period. Inspection elements, for example IPS and AV may provide a list of attacks or incidents along with their corresponding frequencies of occurrence. The frequency could be also be provided as an average or as a maximum rate observed. Application control, for example may provide a list of the applications and protocols to be emulated, along with the amount of traffic they generate. The amount of traffic could also be calculated as an average or the max value observed.

The performance related parameters may include factors that are used to evaluate performance of a network device within a target network environment. In some embodiments, the performance related parameters and data associated with the performance related parameters include, but are not limited to, concurrent connections/flows, connections per second, flow per second, and throughput. The performance related parameters and data associated with the performance related parameters may include any or a combination of a number of connections per second between different network devices present in the target network environment, an average number of concurrent connections between the different network devices present in the target network environment, a maximum number of concurrent connections between the different network devices present in the target network environment, an average number of connected devices present in the deployment environment, a maximum number of connected devices present in the target network environment, network traffic throughput in the target network environment, and network traffic latency within the target network environment.

The performance related parameter for a network device being validated for the target network environment may be defined by a user. Based on the user defined performance related parameters, data associated with the performance related parameters may be determined by analysis of the security and network telemetry information as retrieved from pre-installed networks devices of the target network environment. In an embodiment, both the performance related parameters and data associated with performance related parameters can be determined by analyzing the security and network telemetry information. In an embodiment, performance related parameters can be determined, by the test generator using a machine learning approach. The test generator can identify a pre-validated network device that matches the nature of the network device being validated, and performance related parameters that were used to validate the pre-validated network device can be determined to be the performance related parameters based on which the network device being validated can be tested and verified.

In an embodiment, module 206 configured within test profile generator 200 may derive a test profile for validating a network device under test proposed to be installed within the target network environment based on any or combination of the performance related parameters, the data associated with the performance related parameters, the security and network telemetry information and a set of capabilities of the network device under test. In an embodiment, the set of capabilities of the network device under test can be defined by the user. In another embodiment, the set of capabilities of the network device under test can be determined by test profile generator 200 using a machine learning approach. Test profile generator 200 may determine the set of capabilities of the network device under test by identifying a set of capabilities used to validate an existing network device matching closely with the network device under test. In an embodiment, the set of capabilities of the network device under test may be generated using a human-assisted machine generated process. In an embodiment, module 206 may derive the test profile for the network device under test using a machine learning approach. Module 206 may use machine learning to match the determined performance related parameters with performance related parameters associated with pre-configured test profiles. Module 206 can then determine the test profile that more closely matches the traffic patterns expected to be encountered in the target network environment. In some embodiment, module 206 may derive a closely matching test profile from pre-configured test profiles by matching the determined performance related parameters with performance related parameter associated with each of the pre-configured traffic profiles.

In some embodiments, module 206 can select one test profile from the list of pre-configured test profiles using a machine learning technique (for example, support vector machine, linear regression, logistic regression, multinomial logistic regression etc.). The pre-configured test profiles or the derived test profiles may include test profiles for testing one or more of HTTP/HTTPS connections per second (CPS), HTTP/HTTPS requests per second (RPS), HTTP/HTTPS concurrent connections (CC), IPsec performance, IPsec tunnel CC, TCP throughput, TCP CC, Turbo TCP, TCP throughput, UDP throughput, RFC 2544 throughput/latency/data loss, mail, attack replay, traffic replay, DDoS, DNS latency, RTSP, packet capture, RTSP/RTP, and mixed traffic.

In an embodiment, module 206 may be a software or hardware component responsible of deriving the test profile. The derived test profile may be representative of traffic patterns observed during the monitoring period. In an embodiment, the test profile may be derived from statistical analysis of the security and network telemetry information retrieved by module 202.

In an embodiment, test profile generator 200 may provide a user interface for allowing the user or operator to adjust different settings. For example, test profile generator 200 can enable a user to configure, through a browser-based interface, the monitoring period for monitoring and collecting the security and network telemetry information from one or more network devices running within the target network environment, and telemetry methods to be used for retrieving security and network telemetry information. The user interface may also allow the user to select an analysis criteria (high peak, low peak, average, median, etc.) for determining data associated with performance related parameters. In an embodiment, the user interface may also allow the user to select traffic parameters to be monitored by one or more network device running within the target network environment.

In an embodiment, the derived test profile may be sent to simulation and reporting module 208. In some embodiments, a machine generated test profile can be used for simulating or testing the network device. In an embodiment, simulation and reporting module 208 configured within test profile generator 200 may enable simulation of network traffic of the target network environment based on the derived test profile. Simulation results may be recorded by test profile generator 200 and can be displayed to the user. Simulation and reporting module 208 may generate emulated network traffic to be processed by the network device under test in a lab environment based on the observed traffic patterns within target network environment, thereby allowing the network device under test to be validated for use in the target network environment.

Test profile generator 200 enables a network device to be tested in a lab environment against a derived test profile. Deriving a test profile for validating the network device under test and simulating traffic patterns according to the derived test profile eliminate or reduce the need for testing the network device in the target network environment. In this manner, test profile generator 200 can validate the working on the network device for the target network environment without actually installing the network device in the target network environment.

In an embodiment, multiple test profiles can be derived for validating the network device under test. Simulation and reporting module 208 can cause different test profiles to be executed on the network device in a sequential or random manner. For each test profile, the working of the network device under exemplary conditions expected to be observed in the target network environment can be simulated. In an embodiment, traffic profile generator 200 can generate emulated traffic for a pre-defined time duration. Module 208 can display results of the behavior of the network device under test for each test profile. Simulation and report module 208 can enable a user to locate and browse through the results associated with each test profile.

In an embodiment, test profile generator 200 can configured to generate traffic closely matching the traffic patterns of the target network environment and cause the test profile to be executed on the network device, and thereby evaluate the ability of the network device under test to operate within the target network environment.

In an embodiment, test profile generator 200 can be used to generate test profiles for testing and validating any networking device, network security device, network security infrastructure and network security services. In an embodiment, test profile generator 200 can be configured to derive test profiles as defined by one or more standards for the class of network device to which the network device under test belongs. Test profile generator 200 can enable a user to establish performance standards and run audits to validate that the standard requirements are met be the network device under test.

Figure 2B:
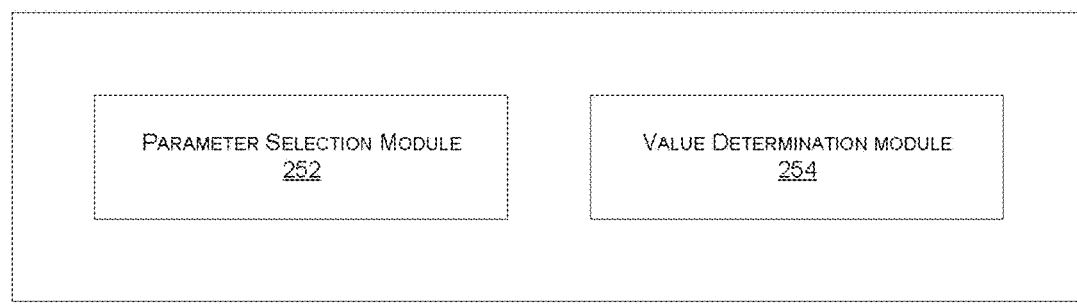
FIG. 2B illustrates exemplary sub-modules of a performance related parameter determination module in accordance with an embodiment of the present invention.

FIG. 2B illustrates exemplary sub-modules of a performance related parameter determination module 250 in accordance with an embodiment of the present invention. In an embodiment, performance related parameter determination module 250 may include a parameter selection module 252 configured to select performance related parameters, and a value determination module 254 configured to determine data associated with selected performance related parameters. In an embodiment, parameter selection module 252 may provide a user interface to operator to select a set of performance related parameters to be used by test profile generator 200 for determining test profiles and for traffic emulation. In an embodiment, the number and type of performance related parameters available for selection may be limited to those supported by the telemetry methods used during telemetry gathering. As those skilled in the art will appreciate, the more parameters that are selected, the more complete will be the resulting emulation. In an embodiment, value determination module 254 may be configured to determine a value, also referred to as data, associated with the performance related parameters. Based on the value and timestamp, module 254 can determine any or combination of a highest value, a high value duration, a lowest value, a low value duration and a period value average. In an embodiment, the security and network telemetry information may include the values and timestamps recorded during telemetry gathering. Module 254 may use the value and timestamp information to identify the highest and lowest values recorded for each one of the performance related parameters selected for analysis. The security and network telemetry information may be analyzed sequentially, starting from the first value recorded at the beginning of the monitoring period (t1, time one). For a given performance related parameter, the value recorded at t1 may be the initial lowest and highest value.

$$HVx=LVx=vx(t1)$$

where HVx is the highest value, LVx is the lowest value, and Vx(t1) is the actual value recorded at the first time period (time 1) for parameter X.

In an embodiment, module 254 may continue to evaluate the recorded values sequentially, continuing with t2, t3 and until reaching the end of the monitoring period (tn). The highest and lowest values should be updated as new higher and lower values are found in subsequent time. A new highest value is defined as any subsequent value higher than the previously recorded highest value.

$$\text{If } Vx(ty)>HVx \text{ then } HVx=Vx(ty)$$

Being ty time period Y. Likewise, a new lowest value may be defined as any subsequent value lower than the previously recorded lowest value.

$$\text{If } Vx(ty)<LVx \text{ then } LVx=Vx(ty)$$

In an embodiment, module 254 may determine a highest value duration and a lowest value duration by analyzing the security and network telemetry information. As module 252 identifies the new highest and lowest values sequentially, module 252 may also keep track of their duration. While in the context of the present example, the highest and lowest values are updated every time a new highest or lowest value is identified, a sequence of values that are very close may be counted towards the duration of the same highest or lowest value. That is, subsequent values with a difference of less than a predefined or configurable percentage, here called tolerance (T), may be considered part of same peak or valley. The number of periods of samples falling into the same highest or lowest value should be counted towards its duration. A duration can be as small as a single period. As explained earlier, at t1 the value recorded may be the initial lowest and highest value. Therefore, the duration of both highest and lowest values at t1 may be 1.

$$HDx=LDx=1$$

HDx being the highest value duration, and LDx the lowest value duration for parameter X.

Module 604 may evaluate the recorded values sequentially in order to identify new highest and lowest values, and keep track of their respective durations. For every Vx value analyzed, module 604 may perform the following evaluation:

If the difference between Vx(t) and HVx is less than or equal to Tx, then HDx=HDx+1 else HDx=1

That is, if the difference between the value for parameter x at time t (Vx(t)) and the highest recorded value (HDx) is lower than the tolerance for parameter x (Tx), then that period may be counted towards the duration. However, if the difference is higher than the tolerance Tx, that would indicate a start of a new period, therefore the HDx may be set to 1. Likewise, for the lowest value duration following calculation may be performed if the different between Vx(t) and LVx is less than or equal to Tx, then LDx=LDx+1 else LDx=1

In an embodiment, module 604 may also determine average values for each of the performance related parameters. The average value for each parameter may be calculated as follows:

$$AV(x)=\text{Sum}(Vx(t1):Vx(tn))/tn$$

where n is the number of time periods recorded during telemetry gathering.

Figure 3:
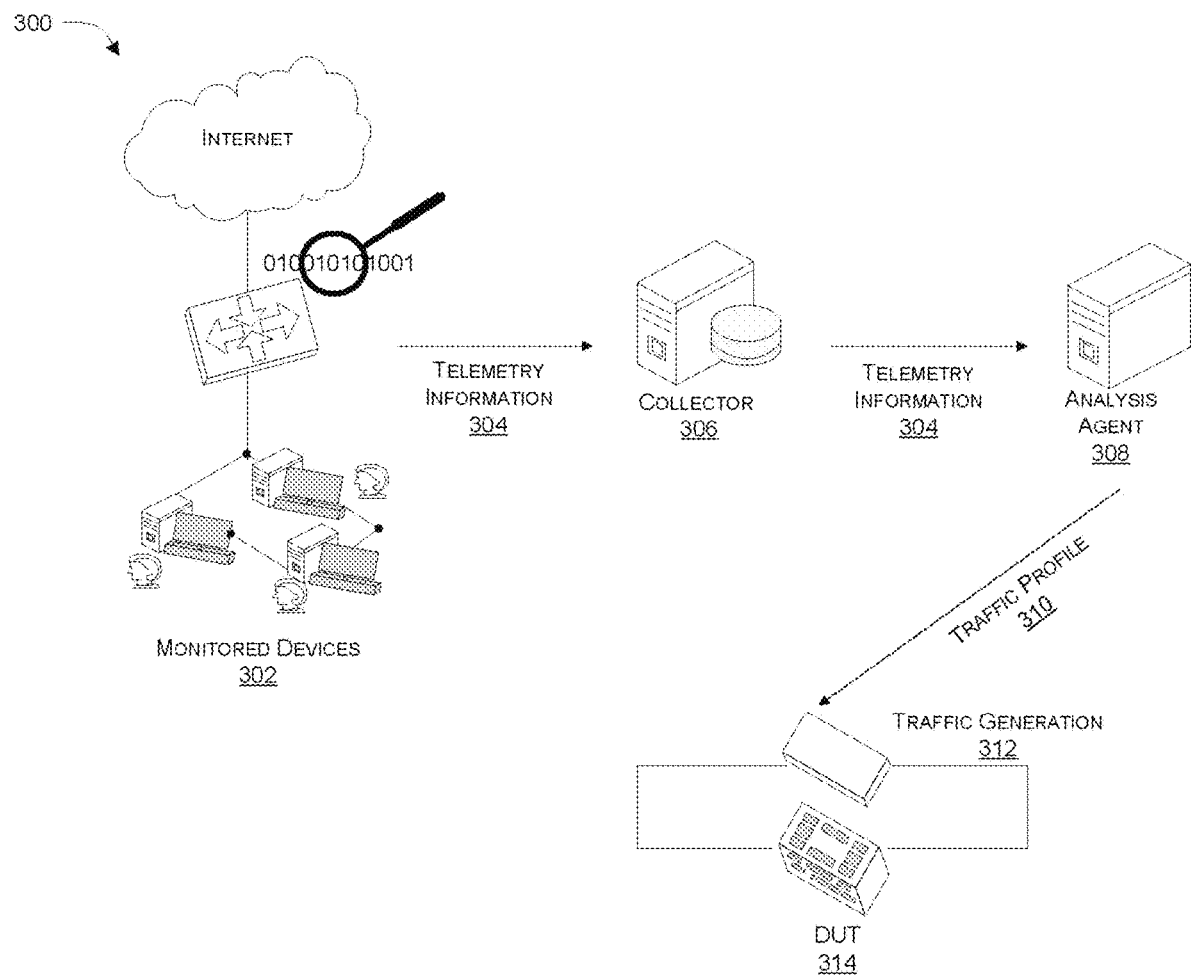
FIG. 3 illustrates an exemplary network arrangement of system for collecting security and network telemetry information, analyzing the traffic and deriving and applying test profiles for network device under test in accordance with an embodiment of the present invention.

FIG. 3 illustrates an exemplary network arrangement of a system 300 for collecting security and network telemetry information, analyzing the traffic and deriving and applying test profiles for network device under test in accordance with an embodiment of the present invention. As shown in FIG. 3, system 300 may include a collector 306 configured to gather or collect (which may also be referred to herein as retrieving) security and network telemetry information 304 associated with monitored devices 302 of a target network environment. Collector 306 can retrieve security and network telemetry information 304 associated with monitored device 302 through the Internet, and also within the target network environment. In an embodiment, the telemetry method or method to collect security and network telemetry information can be configured by a user. Collector 306 may collect and store the security and network telemetry information in a database. In an embodiment, the telemetry method to be used by collector 306 can be configured by an operator through a user interface (UI) associated with collector 306. The collector's UI can enable the operator to select a telemetry method and configure specific parameters associated with the selected telemetry method. For example, for a select telemetry method, such as SNMP, the operator can configure a server IP address, community and authentication parameters associated with SNMP. In an embodiment, the collector's interface enables the operator to configure security and network parameters, which are desired to be monitored during the monitoring period and which will form part of the security and network telemetry information.

After retrieving security and network telemetry information collected during the monitoring period, an analysis agent 308 can determine performance related parameters and data associated with the performance related parameters for the target network environment, and can derive a test profile for validating a network device under test (DUT) 314 proposed to be installed within the target network environment. Analysis agent 308 can derive the test profile based on any or a combination of the performance related parameters, the data associated with the performance related parameters, the security and network telemetry information and a set of capabilities of the network device under test.

Once the test profile is derived, analysis agent 308 can send test profile 310 to traffic generator 312, which can generate traffic to be processed by DUT 314 based on the derived test profile so as to simulate the operation of DUT 314 within the target network environment.

In an embodiment, once the monitoring period finishes, analysis agent 308 may access the security and network telemetry information stored in the collector's database. Analysis agent 308 may extract necessary information from the collector's database and calculate performance related parameters needed for traffic emulation. In an embodiment, analysis agent 308 may assist in structuring the traffic emulation. Analysis agent 308 may select performance related parameters to be analyzed and can determine data associated with the performance related parameters. The data associated with the performance related parameters can be determined based on the highest, lowest, or average values of the performance related parameters, for example, observed during the monitoring period. In an embodiment, the analysis agent 308 can define structure of the traffic emulation.

Figure 4:
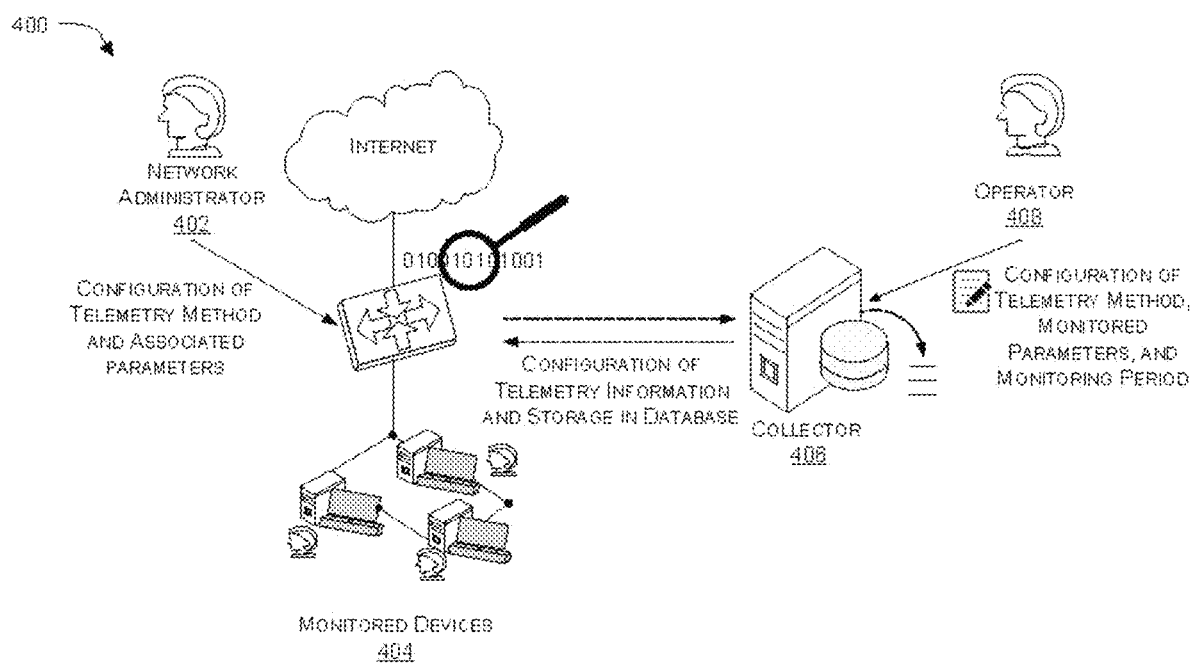
FIG. 4 illustrates an exemplary network set-up in which security and network telemetry information collection methods and parameters to be analyzed can be configured by a network administrator in accordance with an embodiment of the present invention.

FIG. 4 illustrates an exemplary network set-up in which security and network telemetry information collection methods and parameters to be analyzed can be configured by a network administrator in accordance with an embodiment of the present invention. As shown in FIG. 4, an operator 408 of collector 406 can configure a telemetry method to be used for retrieval of security and network telemetry information from one or more network devices providing security and connectivity to monitored devices 404. In an embodiment, a network administrator can configure the telemetry method via the network devices for providing security and network telemetry information. As those skilled in the art will appreciate, network administrator 402 is the one who manages the target network environment and operator 408 is the one who is responsible for validating the network device under test. In an exemplary embodiment, operator 408 can configure one or more parameters to be monitored and the monitoring period during which the security and network telemetry information may be collected. Network administrator 402 and operator 408 may work together to agree upon and finalize the telemetry method to be used, parameters to be monitored and the monitoring period. The configured telemetry method, parameters to be monitored and monitoring period can be stored in a database of collector 406.

In an embodiment, the telemetry methods from which operator 408 or network administrator 402 can choose include, but are not limited to, a push method or a poll method. For each one of the pull methods configured, collector 406 may query the corresponding monitored parameters, for example, at regular intervals (defined by the monitoring frequency). In an embodiment, collector 406 may receive the pushed information provided by the push telemetry methods configured, such as SNMP traps and Syslog. For both cases, all configured monitored parameters available to the method may be tracked. As those skilled in the art will appreciate, these monitored parameters form part of the security and network telemetry information. For each of the parameters available, collector 406 tracks of the value of the parameters, and the timestamp of the measurement. The security and network telemetry information may be collected and stored in a local database associated with collector 406.

Figure 5A:
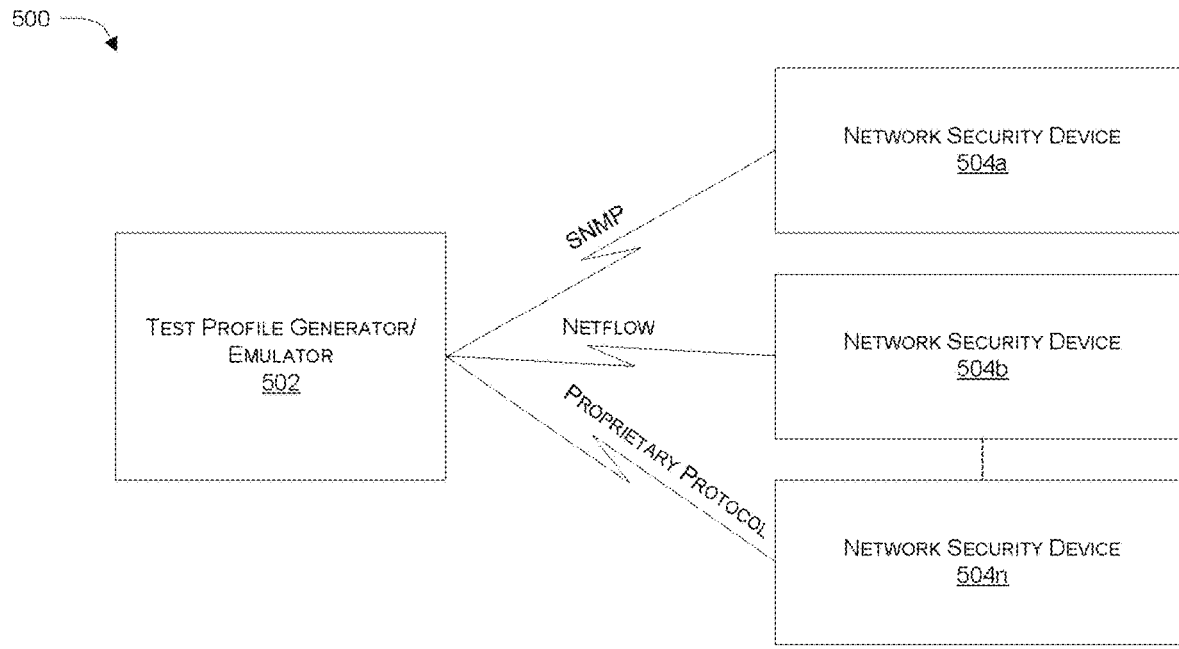
FIG. 5A is a simplified block diagram illustrating collection of security and network telemetry information by a test profile generator/emulator from a target deployment environment using different protocols in accordance with an embodiment of the present invention.

FIG. 5A is a simplified block diagram 500 illustrating collection of security and network telemetry information by a test profile generator/emulator 502 from a target deployment environment using different protocols in accordance with an embodiment of the present invention. In an embodiment, test profile generator 502, which may represent collector 406 or collector 306, can use different protocols, for example, SNMP, NETFLOW, or a proprietary protocol to collect security and network telemetry information from network security devices 504a-n present within the target network environment.

Figure 5B:
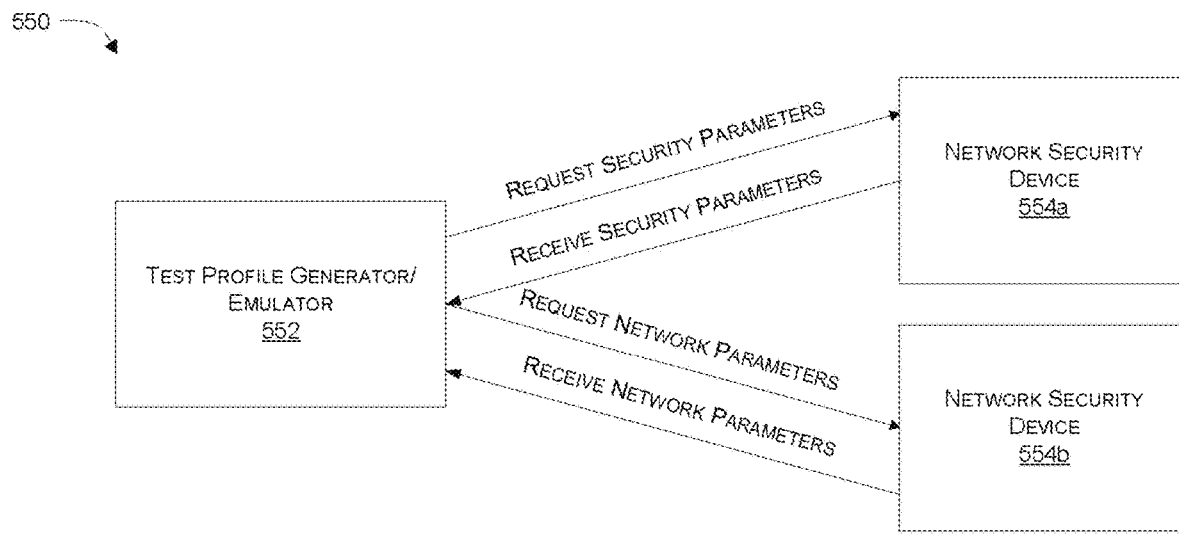
FIG. 5B is a simplified block diagram illustrating collection of security and network telemetry information by a test profile generator/emulator from a target deployment environment by querying network security devices operating within the target deployment environment in accordance with an embodiment of the present invention.

FIG. 5B is a simplified block diagram 550 illustrating collection of security and network telemetry information by a test profile generator/emulator 552 from a target deployment environment by querying network security devices 555a-b operating within the target deployment environment in accordance with an embodiment of the present invention. In an embodiment, test profile generator 552, which may represent collector 406 or collector 306, may collect part of the security and network telemetry information, for example security parameters from network security device 554a and part of the security and network telemetry information, for example network parameters from network security device 554b. Test generator 552 may send a request to network security device 554a for security parameters and data associated with the security parameters, and may send a request to network security device 554b for network parameter and data associated with the network parameters. The network parameters and data associated with the network parameters, and security parameters and data associated with the security parameters together form part of the security and network telemetry information, which is used for generating test profile.

Figure 6:
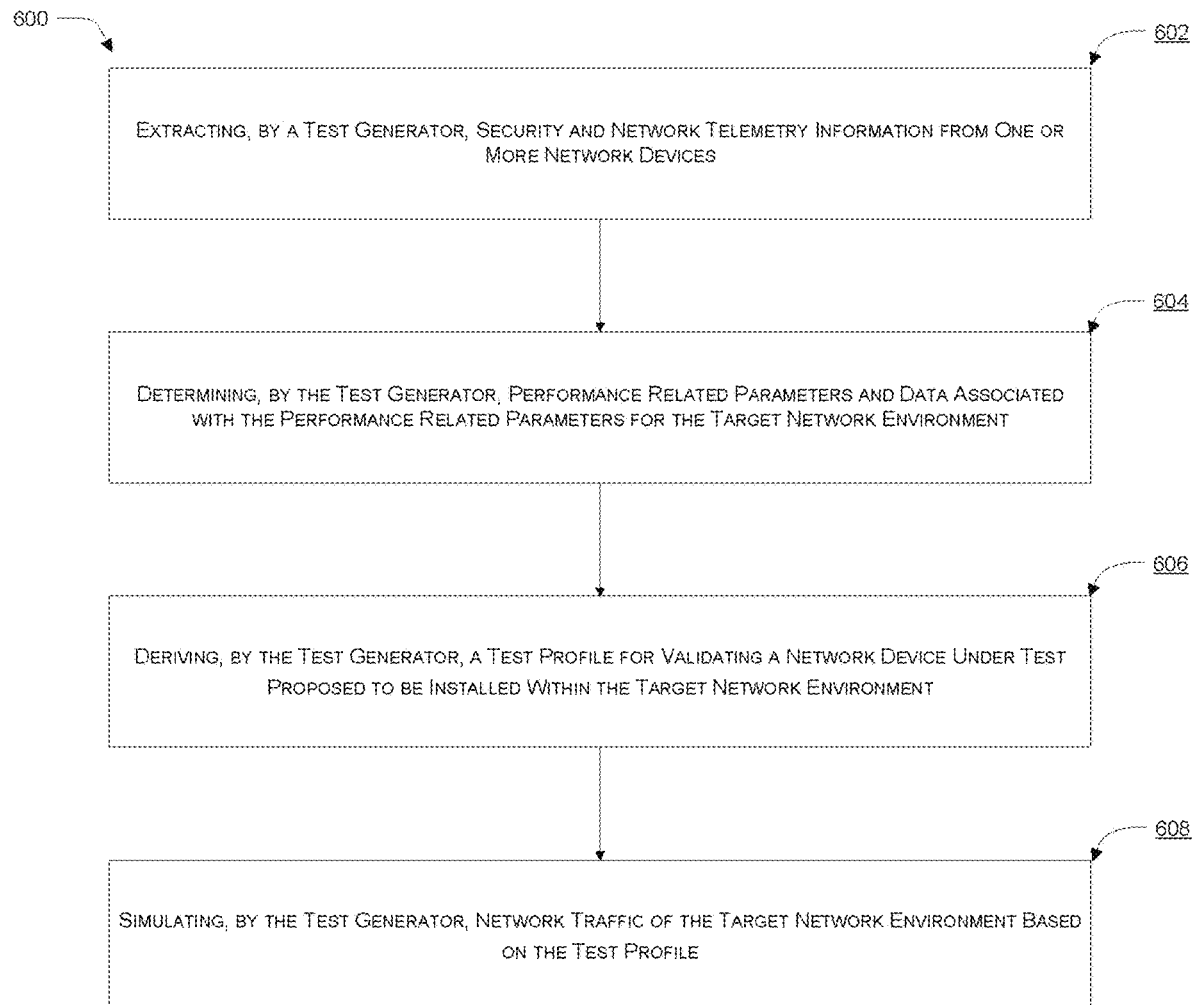
FIG. 6 is a flow diagram illustrating the overall process of deriving test profiles and validating a network device for a target deployment environment in accordance with an embodiment of the present invention.

FIG. 6 is a flow diagram 600 illustrating the overall process of deriving test profiles and validating a network device for a target deployment environment in accordance with an embodiment of the present invention. In the context of the present example, validation of a network device under test may include the steps of extracting security and network telemetry information from one or more network devices as shown at step 602, determining performance related parameters and data associated with the performance related parameters for the target network environment as shown at step 604 and deriving a test profile for validating a network device under test proposed to be installed within the target network environment based on any or combination of the performance related parameters, the data associated with the performance related parameters, the security and network telemetry information and a set of capabilities of the network device under test as shown at step 606.

The process further includes the step of simulating, by the test generator, network traffic of the target network environment based on the test profile as shown step 608. In an embodiment, network traffic of the target network environment may be simulated for the network device under test in a lab environment. The test profile may be used to generate traffic and run different tests on the network device under test.

In an embodiment, the security and network telemetry information may be retrieved by the test generator installed temporarily within the target network environment during a monitoring period. The monitoring period may be configured by an operator or user of the test generator. In an embodiment, the network parameters and security parameters to be monitored by the one or more network devices running within target network environment may be configured by the user. The network parameters and security parameters, and data associated with the network parameters and security parameters form part of the security and network telemetry information retrieved by the test generator. In an embodiment, the security and network telemetry information may be extracted from the one or more network devices using any or a combination of SNMP, NetFlow, SysLog and a proprietary protocol of the test generator.

In an embodiment, the security and network telemetry information includes data associated with network parameters as well as data associated with security parameters. In an embodiment, the network parameters include but are not limited to information regarding protocols used, number of connected devices, applications used, bandwidth usage, packet sizes observed and traffic patterns observed within the target network environment during the monitoring period. In an embodiment, the security parameters include but are not limited to data associated with Intrusion Detection System (IDS), security incidences, antivirus activities, application control information, rules associated with IDS, rules associated with Intrusion Prevention System (IPS), and rules associated with Denial of Service (DOS) attacks.

Based on the retrieved security and network telemetry information, performance related parameters and data associated with the network related parameters may be determined. In an embodiment, the user can select performance related parameters and data associated with the performance related parameters may be determined from the security and network telemetry information. In an embodiment, the performance related parameters may be determined by the test generator using machine learning method, which can identity performance related parameters selected by the user for a pre-validated network device of similar nature. In an embodiment, the performance related parameters include but are not limited to concurrent connections/flows, connections per second, flow per second, and throughput. The performance related parameter may be any or a combination of a number of connections per second between different network devices present in the target network environment, an average number of concurrent connections between the different network devices present in the target network environment, a maximum number of concurrent connections between the different network devices present in the target network environment, an average number of connected devices present in the deployment environment, a maximum number of connected devices present in the target network environment, throughput of devices present in the target network environment, and latency between the different devices present in the target network environment.

In an embodiment, a set of capabilities of the network device under test may be selected by a network administrator (which may also be referred to interchangeably herein as the user) or may be derived from listed capabilities of the network device under test.

The network device under test may be a networking device or a network security device. In an embodiment, the network device under test may be any networking or network security device including, but not limited to, a UTM appliance, an IPS, an IDS, a gateway device, a network controller device, a firewall, a router, a DDoS prevention device, and a software defined networking security device.

In an embodiment, the test generator may determine one or more test profiles for validating the network device under test using a machine learning approach, wherein the determined performance related parameters are matched with the performance related parameters of the pre-configured test profiles and the test profile from pre-configured test profile that matches more closely can be derived for validating the network device under test.

Figure 7:
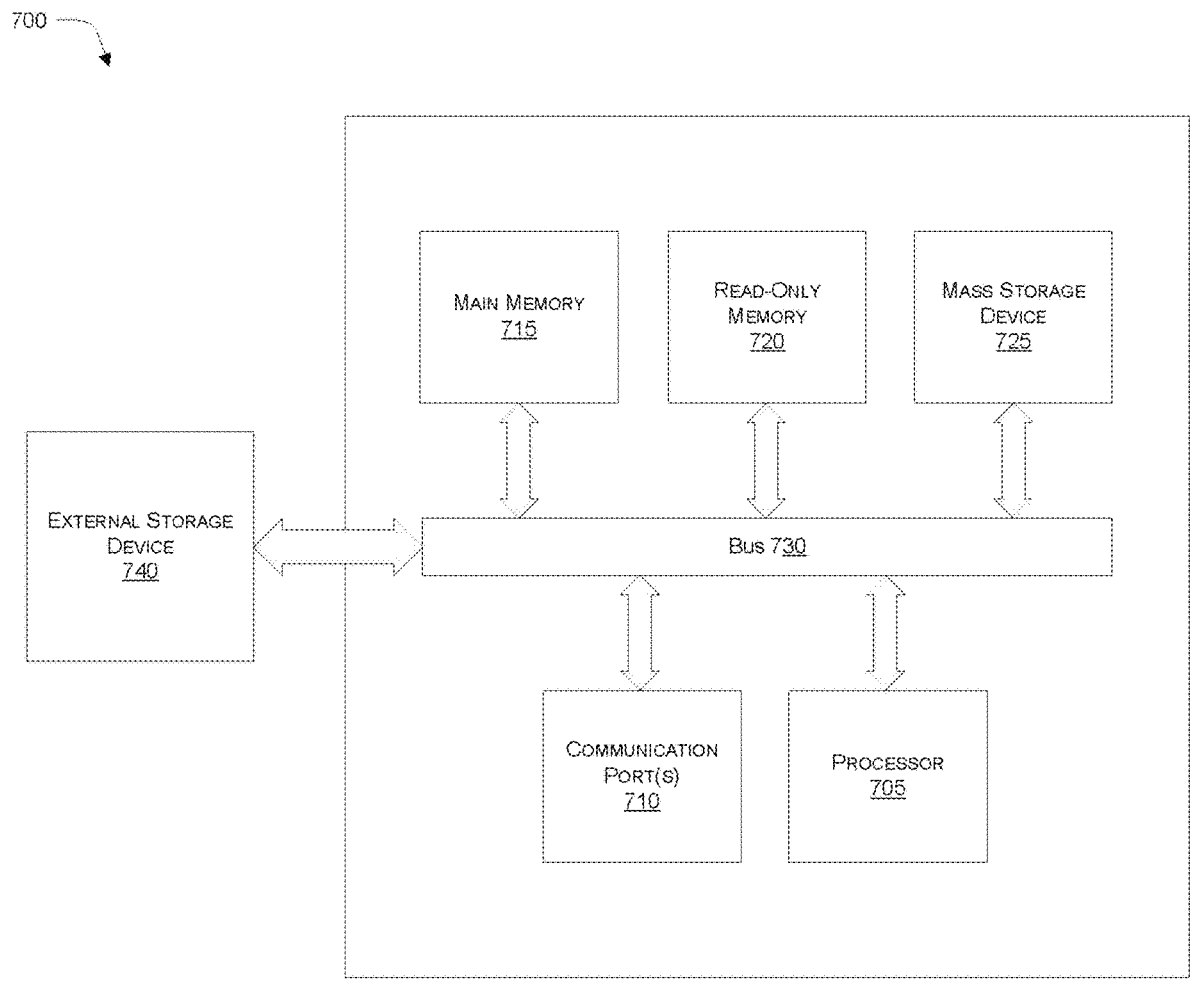
FIG. 7 illustrates an exemplary computer system in which or with which embodiments of the present invention may be utilized.

FIG. 7 illustrates an exemplary computer system in which or with which embodiments of the present invention may be utilized. The computer system 700 may represent all or a portion of a test profile generator (e.g., test generator 154, test profile generator 200, test profile generator/emulator 502 or test profile generator 3mulator 552), collector 306 or 406, analysis agent 308 and/or traffic generator 312 and can be configured to execute the steps of method 600 as described above with reference to FIG. 6.

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 700 includes a bus 730, a processor 705, communication port 710, a main memory 715, a removable storage media 740, a Read-Only Memory (RAM) 720 and a mass storage 725. A person skilled in the art will appreciate that computer system 700 may include more than one processor and communication ports.

Examples of processor 705 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 705 may include various modules associated with embodiments of the present invention.

Communication port 710 can be any of an RS-232 port for use with a modem based dialup connection, a 10/100 Ethernet port, a Gigabit or 10 Gigabit port using copper or fiber, a serial port, a parallel port, or other existing or future ports. Communication port 710 may be chosen depending on a network, such a Local Area Network (LAN), Wide Area Network (WAN), or any network to which computer system 700 connects.

Memory 715 can be Random Access Memory (RAM), or any other dynamic storage device commonly known in the art. Read only memory 720 can be any static storage device(s) such as, but not limited to, a Programmable Read Only Memory (PROM) chips for storing static information such as start-up or BIOS instructions for processor 705.

Mass storage 725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 730 communicatively couples processor(s) 705 with the other memory, storage and communication blocks. Bus 730 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 705 to system memory.

Optionally, operator and administrative interfaces, such as a display, keyboard, and a cursor control device, may also be coupled to bus 730 to support direct operator interaction with computer system 700. Other operator and administrative interfaces can be provided through network connections connected through communication port 710.

Removable storage media 740 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

What is claimed is:

1. A method comprising:
during a monitoring period, obtaining, by a test generator, security and network telemetry information from a target environment by extracting log information from network event logs and security event logs maintained by one or more network devices running within the target network environment;
determining, by the test generator, performance related parameters and data associated with the performance related parameters for the target network environment based on the obtained security and network telemetry information; and
deriving, by the test generator, a test profile specific to the target network environment for validating a network device under test proposed to be installed within the target network environment based on any or a combination of the performance related parameters, the data associated with the performance related parameters, the security and network telemetry information and a set of capabilities of the network device under test.

2. The method of claim 1 further comprising:
simulating, by the test generator running within a lab environment including the networking device under test, network traffic of the target network environment based on the test profile; and
recording, by the test generator, results of said simulating.

3. The method of claim 1, wherein said deriving, by the test generator, a test profile comprises use of machine learning including matching of the determined performance related parameters with performance related parameters present in pre-configured test profiles.

4. The method of claim 1, wherein the log information is extracted from the one or more network devices using any or a combination of Simple Network Management Protocol (SNMP), NetFlow, SysLog and a proprietary protocol of the test generator.

5. The method of claim 1, wherein the security and network telemetry information comprises network parameters, including any or a combination of information regarding protocols used, a number of connected devices, applications used, bandwidth usage, packet sizes observed and traffic patterns observed within the target network environment during the monitoring period.

6. The method of claim 1, wherein the performance related parameters and data associated with the performance related parameters comprise concurrent connections/flows, connections per second, flow per second, and throughput.

7. The method of claim 1, wherein the performance related parameters and data associated with the performance related parameters comprise any or a combination of a number of connections per second between different network devices present in the target network environment, an average number of concurrent connections between the different network devices present in the target network environment, a maximum number of concurrent connections between the different network devices present in the target network environment, an average number of connected devices present in the deployment environment, a maximum number of connected devices present in the target network environment, throughput of devices present in the target network environment, and latency between the different devices present in the target network environment.

8. The method of claim 1, wherein the security and network telemetry information comprises security parameters, including any or a combination of data associated with Intrusion Detection System (IDS), security incidences, antivirus activities, application control information, rules associated with IDS, rules associated with Intrusion Prevention System (IPS), and rules associated with Denial of Service (DoS) attacks.

9. The method of claim 1, wherein the set of capabilities include a set of capabilities of the network device under test to be tested and which are selected by a network administrator or are derived from listed capabilities of the network device under test.

10. The method of claim 1, wherein the network device under test comprises any or a combination of a unified threat management (UTM) appliance, an Intrusion Prevention System (IPS), an Intrusion Detection System (IDS), a gateway device, a network controller device, a firewall, a router, a Distributed Denial of Service (DDoS) prevention device, and a software defined networking security device.

11. A test profile generator system comprising
a non-transitory storage device having embodied therein one or more routines; and
one or more processors coupled to the non-transitory storage device and operable to execute the one or more routines to perform a method comprising:
during a monitoring period, obtaining, security and network telemetry information from a target environment by extracting log information from network event logs and security event logs maintained by one or more network devices running within the target network environment;
determining performance related parameters and data associated with the performance related parameters for the target network environment based on the obtained security and network telemetry information; and
deriving a test profile specific to the target network environment for validating a network device under test proposed to be installed within the target network environment based on any or a combination of the performance related parameters, the data associated with the performance related parameters, the security and network telemetry information and a set of capabilities of the network device under test.

12. The test profile generator system of claim 11, wherein the method further comprises:
simulating, by the test generator running within a lab environment including the networking device under test, network traffic of the target network environment based on the test profile; and
recording results of said simulating.

13. The test profile generator system of claim 11, wherein said deriving a test profile comprises use of machine learning including matching of the determined performance related parameters with performance related parameters associated with a plurality of pre-configured test profiles.

14. The test profile generator system of claim 11, wherein the log information is extracted from the one or more network devices using any or a combination of Simple Network Management Protocol (SNMP), NetFlow, SysLog and a proprietary protocol of the test profile generator.

15. The test profile generator system of claim 11, wherein the security and network telemetry information comprises network parameters, including any or a combination of information regarding protocols used, a number of connected devices, applications used, bandwidth usage, packet sizes observed and traffic patterns observed within the target network environment during the monitoring period.

16. The test profile generator system of claim 11, wherein the performance related parameters and data associated with the performance related parameters comprise concurrent connections/flows, connections per second, flow per second, and throughput.

17. The test profile generator system of claim 11, wherein the performance related parameters and data associated with the performance related parameters comprise any or a combination of a number of connections per second between different network devices present in the target network environment, an average number of concurrent connections between the different network devices present in the target network environment, a maximum number of concurrent connections between the different network devices present in the target network environment, an average number of connected devices present in the deployment environment, a maximum number of connected devices present in the target network environment, throughput of devices present in the target network environment, and latency between the different devices present in the target network environment.

18. The test profile generator system of claim 11, wherein the security and network telemetry information comprises security parameters, including any or a combination of data associated with Intrusion Detection System (IDS), security incidences, antivirus activities, application control information, rules associated with IDS, rules associated with Intrusion Prevention System (IPS), and rules associated with Denial of Service (DoS) attacks associated with the target network environment.

19. The test profile generator system of claim 11, wherein the set of capabilities include a set of capabilities of the network device under test to be tested and which are selected by a network administrator or are derived from listed capabilities of the network device under test.

20. The test profile generator system of claim 11, wherein the network device under test comprises any or a combination of a unified threat management (UTM) appliance, an Intrusion Prevention System (IPS), an Intrusion Detection System (IDS), a gateway device, a network controller device, a firewall, a router, a Distributed Denial of Service (DDoS) prevention device, and a software defined networking security device.

* * * * *